Dec. 10, 1968
I. J. PACHTER ET AL
3,415,843
CYCLIC PYRROLE KETONES
Filed Nov. 22, 1966
3 Sheets-Sheet 1
Reaction Scheme I
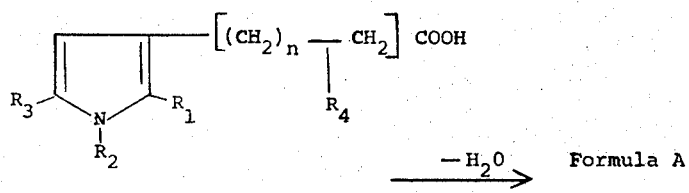
$\xrightarrow{-H_2O}$ Formula A
Reaction Scheme II
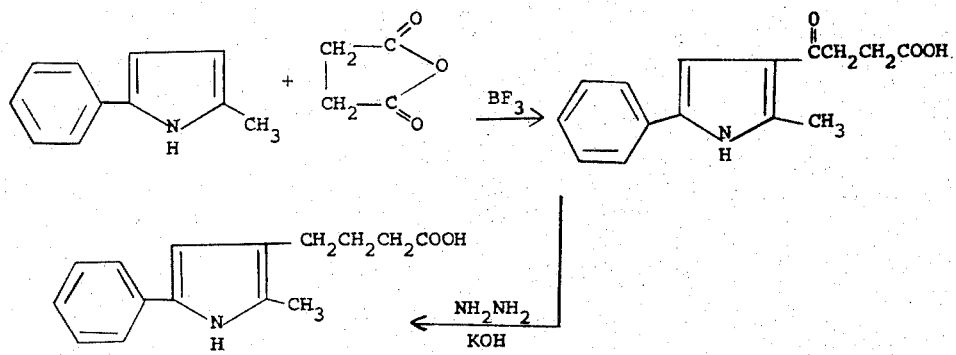
Reaction Scheme III
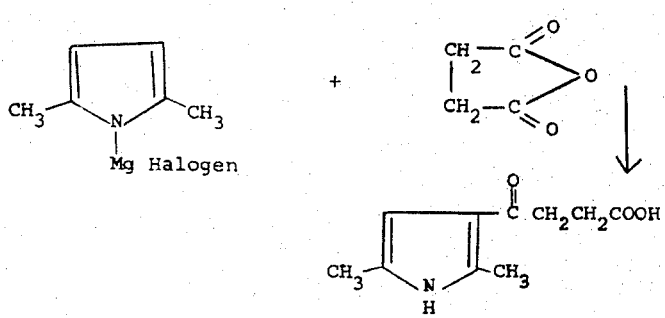
INVENTORS
IRWIN J. PACHTER
WERNER HERZ
BY
ATTORNEYS Dec. 10, 1968   I. J. PACHTER ET AL   3,415,843
CYCLIC PYRROLE KETONES
Filed Nov. 22, 1966   3 Sheets-Sheet 2
Reaction Scheme IV
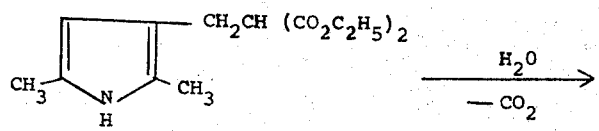
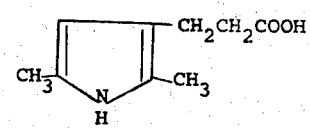
Reaction Scheme V
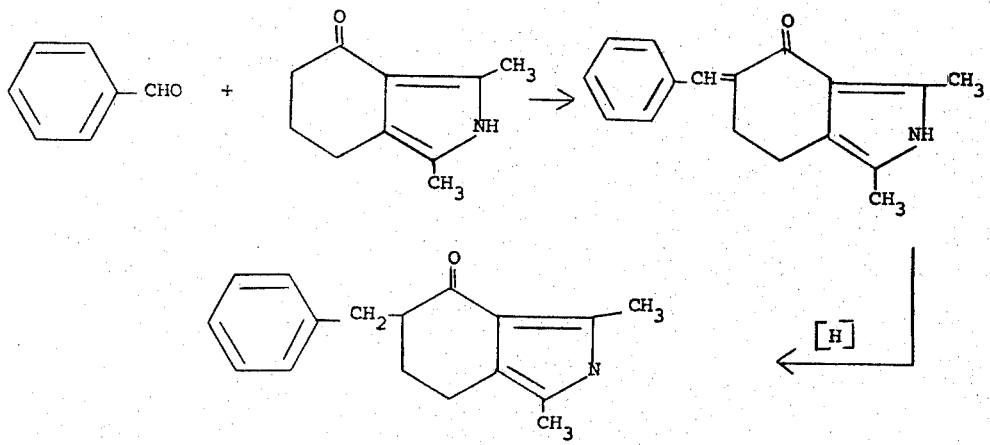
INVENTORS
IRWIN J. PACHTER
WERNER HERZ
BY *Hane & Nydick*
ATTORNEYS Dec. 10, 1968　　　I. J. PACHTER ET AL　　　3,415,843
CYCLIC PYRROLE KETONES
Filed Nov. 22, 1966　　　3 Sheets-Sheet 3
Formula A
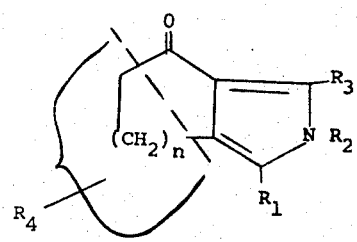
Formula B
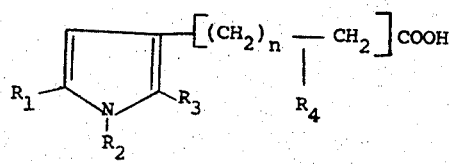
Formula C
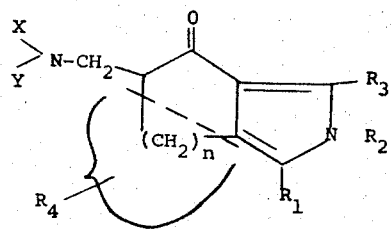
INVENTORS
IRWIN J. PACHTER
WERNER HERZ
BY
ATTORNEYS United States Patent Office 3,415,843
Patented Dec. 10, 1968

3,415,843
CYCLIC PYRROLE KETONES
Irwin J. Pachter, Woodbury, N.Y., and Werner Herz, Tallahasee, Fla., assignors to Endo Laboratories Inc., Garden City, N.Y., a corporation of New York
Filed Nov. 22, 1966, Ser. No. 596,243
8 Claims. (Cl. 260—326.1)

ABSTRACT OF THE DISCLOSURE

This invention relates to certain novel pyrrole ketones and the processes for the preparation thereof. These compounds are useful pharmacologically because of their sedative, tranquilizing and antiinflammatory properties.

---

This invention relates to, and has for its principal object, the provision of novel cyclic pyrrole ketones (having the structural Formula A, hereinafter set forth), and processes for the preparation thereof.

These products have valuable pharmacodynamic activity, to wit, central nervous system activity and antiinflammatory activity. They are particularly useful as sedatives and mild tranquilizers. In addition, they are very valuable as intermediates for the preparation of still other therapeutic products.

The products of this invention are represented by Formula A, as set forth in the accompanying drawing.

In Formula A:

$R_1$, $R_2$, and $R_3$ stand for hydrogen, alkyl having a maximum of six carbon atoms, phenyl, phenyl alkyl in which the alkyl has a maximum of three carbon atoms, substituted phenyl and substituted phenyl alkyl in which the substituent on the phenyl ring is halogen, alkyl of not more than four carbon atoms, alkoxy of not more than four carbon atoms or halo alkyl, e.g., trifluoromethyl, of not more than four carbon atoms;
$R_4$ stands for hydrogen, alkyl having a maximum of four carbon atoms, alkylidene having a maximum of four carbon atoms, benzylidene and benzyl;
$n$ stands for 1, 2 or 3.

Throughout this specification, all symbols have the same meaning as first defined herein; unless otherwise specifically defined.

The products of Formula A are prepared by dehydrative cyclization from pyrrol-3-ylalkanoic acids of Formula B, as set forth in the formula illustrated in Reaction Scheme I of the accompanying drawing.

Polyphosphoric acid is a preferred dehydrating agent for the foregoing process, although other dehydrating agents, such as sulfuric acid, may also be employed.

An alternative to direct cyclization is the conversion of compounds of Formula B to corresponding acid halides, such as the acid chloride, prior to cyclization by an appropriate Friedel-Crafts catalyst such as boron trifluoride, stannic chloride and aluminum chloride.

Compounds of Formula B are also novel substances. They are prepared by the following procedures:

(a) Friedel-Crafts synthesis.—Through use of boron trifluoride as catalyst, we discovered that pyrroles may be acylated with cyclic acid anhydrides, such as succinic and glutaric anhydrides, to produce pyrrol-3-yl-ω-oxoalkanoic acids. These, in turn, are reduced by standard procedures, such as the Wolff-Kishner reduction, to compounds of Formula B in which $n$ is 2 or 3.

An illustration of the process is set forth in Reaction Scheme II of the accompanying drawing.

(b) Grignard synthesis.—An alternative to the use of the Friedel-Crafts reaction for the first step of the synthesis of compounds of Formula B is the Grignard reaction. An illustration of this process is set forth in Reaction Scheme III of the accompanying drawing.

(c) Malonic ester synthesis.—The method Herz and Settine [J. Am. Chem. Soc., 24, 201 (1959)] is useful for the preparation of pyrrol-3-yl malonic esters. Hydrolysis and decarboxylation of these esters provides compounds of Formula B in which $n$ is 1. Reaction Scheme IV of the accompanying drawing is illustrative of the process.

These synthetic methods are useful also for preparation of compounds of Formula A in which $R_2$ is a substituent other than hydrogen.

Alternatively, many of the compounds of Formula A in which $R_2$ is a carbon containing substituent, may be prepared by alkylation, under basic conditions, of those compounds in which $R_2$ is hydrogen.

Compounds of Formula A in which $R_4$ is a carbon-containing substituent may be prepared by starting with appropriately substituted malonic esters, succinic anhydrides or glutaric anhydrides. Alternatively, many of the compounds bearing $R_4$ substituents may be prepared from simpler products, as illustrated in the sequence set forth in Reaction Scheme V of the accompanying drawing.

A preferred aspect of the invention relates to compounds of Formula A which are useful as intermediates in the preparation of Mannich bases of Formula C, set forth in the accompanying drawing. Compounds of Formula C and their pharmaceutically acceptable acid addition salts are outstanding drugs for the treatment of anxiety states and mental illness.

The symbols X and Y in Formula C represent hydrogen, or aliphatic or aromatic substituents on nitrogen. When X and Y are linked, the unit consisting of nitrogen, X and Y also constitutes saturated heterocyclic ring system.

Pharmacological evaluation of the compounds of Formula A revealed that they also possess a variety of depressant actions on the central and autonomic nervous system and on the skeletal-muscular system. In addition, many of the compounds demonstrate useful antiinflammatory activity. 4,5,6,7 - tetrahydro-1,3-dimethyl-4-oxoisoindole, for example, which is toxic only at oral doses exceeding 500 mg./kg., when administered orally at doses of 2 to 4 mg./kg., caused a 50% decrease in the spontaneous locomotor activity in rats and mice. It potentiated the sleeping time induced by hexabarbital sodium at doses of less than one mg./kg. and demonstrated significant antiinflammatory activity at a dose of 50 mg./kg. in the carrageenin assay described by Winter [J.P.E.T., 141, 369(1963)].

Results such as these indicate the usefulness of the compounds as sedatives, tranquilizers, skeletal muscle relaxants and antiarthritics.

The compounds can be prepared for use in accordance with customary pharmaceutical procedure, as by incorporation in tablets, capsules and any of the customary forms of pharmaceuticals. They are formulated and used in the same way as known compounds having similar activity such as diazepam, meprobamate and phenylbutazone.

The following are examples in accordance with this invention. Temperatures are in degrees centigrade.

EXAMPLE 1—METHOD A 2,5-dimethyl-γ-oxopyrrole-3-butyric acid, Method A

To a hot solution of 736 g. (7.35 mole) of succinic anhydride in 6 l. of benzene was added 2.09 kg. (14.7 mole) of boron trifluoride etherate. The resulting solution was cooled to 34° and 666 g. (7.00 mole) of 2,5-dimethylpyrrole was added with vigorous stirring. The temperature rose to 42°. Stirring was continued for two hours.

The mixture was then poured onto ice and water. The crude acid was collected, dissolved in dilute aqueous sodium hydroxide, clarified with charcoal and filtered with the aid of celite. The basic solution was acidified to pH 2 and the product was collected and dried. There was obtained 508 g. of 2,5 - dimethyl-γ-oxopyrrole-3-butyric acid, M.P. 158–159.5°.

In similar fashion, 2,5-diethylpyrrole is converted into 2,5 - diethyl - γ - oxopyrrole-3-butyric acid and 2,5-di-t-butylpyrrole is converted into 2,5-di-butyl-γ-oxopyrrole-3-butyric acid.

EXAMPLE 2—METHOD B 2,5-dimethyl-γ-oxopyrrole-3-butyric acid, Method B

To a Grignard solution prepared from 13.5 g. of magnesium, 60.5 g. of ethyl bromide and 150 ml. of ether was added 47.6 g. of 2,5-dimethylpyrrole in 140 ml. of ether. After 15 minutes, a solution of 55.5 g. of succinic anhydride in 560 ml. of tetrahydrofuran was added. The resulting mixture was heated under reflux with stirring for 20 minutes. Addition of 25% aqueous ammonium chloride terminated the reaction. The ether tetrahydrofuran layer was evaporated to dryness. The residue was shaken with aqueous sodium hydroxide and washed with ether. The alkaline layer was acidified and the product was collected. It was recrystallized from methyl ethyl ketone and proved to be identical with the product of Example 1.

In a related process using glutaric anhydride in place of succinic anhydride, 2,5-dimethyl-δ-oxopyrrole-3-valeric acid is obtained, M.P. 149–150° after recrystallization from ethyl acetate.

EXAMPLE 3

2-methyl-γ-oxo-5-phenylpyrrole-3-butyric acid

To a hot solution of 38.3 g. of succinic anhydride in 400 ml. of benzene was added 72.4 g. of boron trifluoride etherate. The resulting solution was cooled to 35° and 40 g. of 2 - methyl-5-phenylpyrrole was added in a rapid stream with stirring. Stirring was continued for 2.5 hours. The mixture was then stirred with ice and water. The crystalline acid which separated was collected. It was dissolved in aqueous ammonia, treated with charcoal and reprecipitated with acetic acid. M.P., upon recrystallization from acetone, 212–213°.

In similar fashion 2 - methyl - 5 - (p - methoxyphenyl) pyrrole produces 2 - methyl - 5 -(p-methoxyphenyl)-γ-oxopyrrole - 3 - butyric acid; 2 - methyl - 5 - (p-tolyl)pyrrole produces 2 - methyl - 5 - (p-tolyl)-γ-oxopyrrole-3-butyric acid; and 2 - methyl - 5 - (p-chlorophenyl)pyrrole, M.P. 125–126°, produces 2-methyl-5-(p-chlorophenyl)-γ-oxopyrrole-3-butyric acid.

EXAMPLE 4

2-methyl-γ-oxo-1,5-diphenylpyrrole-3-butyric acid

A mixture of 13.7 g. of succinic anhydride and 150 ml. of dichloroethane was saturated with gaseous boron trifluoride. A solution of 23.3 g. of 2-methyl-1,5-diphenylpyrrole, M.P. 83–8°, in 50 ml. of dichloroethane was added. The reaction mixture was stirred for two hours and poured onto ice. The dichloroethane layer was extracted with aqueous ammonia. Upon acidification of the ammoniacal extract, the product crystallized. It was recrystallized from benzene and melted at 180–181°.

EXAMPLE 5

2-methyl-5-phenylpyrrole-3-butyric acid

To a solution of 6.9 g. of sodium in 250 ml. of ethanol was added 19.3 g. of 2-methyl-γ-oxo-5-phenylpyrrole-3-butyric acid and 8.8 g. of 85% hydrazine. The resulting solution was heated at 200° for 20 hours. After cooling, excess ethanol was removed under reduced pressure. The residue was mixed with water and extracted with ether. The ethereal extract was discarded and the aqueous solution was acidified. The reduced acid separated and crystallized. It was recrystallized from benzene and melted at 120–122°.

By this procedure 2 - methyl - 5 - (p-methoxyphenyl)-pyrrole - 3 - butyric acid, 2 - methyl-5(p-tolyl)pyrrole-3-butyric acid, 2 - methyl - 5 - (pchlorophenyl)pyrrole-3-butyric acid and 2 - methyl-1,5-diphenylpyrrole-3-butyric acid are produced from their respective oxo compounds.

EXAMPLE 6

1,2,5-trimethyl-γ-oxopyrrole-3-butyric acid

A mixture of 100 g. of succinic anhydride and 800 ml. of benzene was boiled for 15 minutes. To the resulting hot solution was added 284 g. of boron trifluoride etherate. After cooling to 45°, 109 g. of 1,2,5-trimethylpyrrole was added with stirring. The temperature rose to 58° during the addition. Stirring was continued for 1.5 hours and the mixture was poured into water. The product crystallized. It was collected, washed with water and dried. Upon recrystallization from acetone, it melted at 163–164°.

1-benzyl-2,5-dimethylpyrrole, M.P. 48–49°, prepared from benzylamine and hexane-2,5-dione, is similarly converted into 1 - benzyl-2,5-dimethyl-γ-oxopyrrole-3-butyric acid.

EXAMPLE 7

2,5-tetramethyl-γ-oxopyrrole-3-butyric acid

To a 15 g. of ω,ω-dimethylsuccinic anhydride in 75 ml. of benzene was added 33 g. of boron trifluoride etherate. The solution was stirred and 11 g. of 2,5-dimethylpyrrole was added. After four hours, the mixture was poured into water. Crystalline acid was collected. The benzene layer was extracted with alkali to obtain additional product. The acid melted at 203.5–204° after purification by crystallization from methyl ethyl ketone.

By like procedure α,β-dimethylsuccinic anhydride yields α,β-2,5-tetramethyl-γ-oxopyrrole-3-butyric acid.

EXAMPLE 8

2,4,5,6-tetrahydro-1,3-dimethyl-4-oxocyclopenta-[C]pyrrole

A mixture of 30.8 g. of diethyl 2,5-dimethyl-3-pyrrylmethylmalonate, 19 g. of 85% potassium hydroxide and 17 ml. of water was heated on a steam bath under nitrogen for one hour. The resulting solution was acidified to Congo red paper with 6 N hydrochloric acid. The liberated acid was extracted with ether, dried over magnesium sulfate and distilled to effect decarboxylation. The 2,5-dimethylpyrrol-3-propionic acid boiled at 153–154°/ 0.7–0.8 mm.

The acid was mixed with five times its weight of polyphosphoric acid and heated at 135° for one hour. The mixture was then poured into water. The solid was collected and purified by dissolving it in benzene and passing the benzene solution through a short column of alumina. The product crystallized from benzene, M.P. 245–248° (decomposition).

EXAMPLE 9

4,5,6,7-tetrahydro-1,3-dimethyl-4-oxoisoindole

To a solution of 224 g. (3.38 moles) of 85% potassium hydroxide in 700 ml. of ethanol was added 195.2 g. (1.0 mole) of 2,5-dimethyl-γ-oxopyrrole-3-butyric acid and 139 g. (2.36 moles) of 85% hydrazine. The resulting solution was heated at 195° for 17 hours. After cooling, excess ethanol was removed. The residual salt was treated with water and ether. The ethereal layer was discarded. The aqueous layer was adjusted to pH 6 and an acidic oil separated. It was taken up in ether, dried over magnesium sulfate and recovered by evaporation of the solvent. The crude 2,5-dimethylpyrrole-3-butyric acid (168 g.) was mixed with five times its weight of polyphosphoric acid and heated with stirring at 139–142°, for 2.5 hours. The resulting hot solution was poured onto ice. The product crystallized and was collected. A small additional yield of darker material was obtained by adjusting of the phosphoric acid solution to pH 5. The product was purified conveniently by dissolving it in benzene and passing it through a short column of alumina to remove dark impurities. Removal of the benzene gave a yield of 85 g. of prisms, M.P. 151–152°.

By this procedure, 2,5-dimethyl-γ-oxopyrrole-3-butyric acid and 2,5-di-t-butyl-γ-oxo-pyrrole-3-butyric acid are converted into 1,3-diethyl - 4,5,6,7 - tetrahydro-4-oxoisoindole and 1,3-di-t-butyl-4,5,6,7-tetrahydro - 4 - oxoisoindole. Also in like fashion, 2,5-dimethyl-δ-oxopyrrole-3-valeric acid produces 2,4,5,6,7,8-hexahydro-1,3-dimethyl-4-oxocyclohepta[C]pyrrole.

EXAMPLE 10

4,5,6,7-tetrahydro-1,2,3-trimethyl-4-oxoisoindole

To a solution of 27.1 g. of sodium in 500 ml. of ethanol was added 61.5 g. of 1,2,5-trimethyl-γ-oxopyrrole-3-butyric acid and 34.7 g. of 85% hydrazine. The resulting solution was heated at 190° for 18 hours. Excess ethanol was removed. The residual material was dissolved in water. The aqueous solution was washed with ether and acidified. The ethereal solution was dried and the ether was then evaporated. The residue was mixed with 400 g. of polyphosphoric acid, heated at 140° for 2.5 hours and poured onto ice. The product separated and solidified. It was dissolved in benzene and passed through a short column of alumina to remove colored impurities. Removal of the benzene and recrystallization of the residual solid from cyclohexane gave the pure compound, M.P. 82–83°.

In similar fashion, 1-benzyl-2,5-dimethyl-γ-oxopyrrole-3-butyric acid is converted into 2-benzyl-4,5,6,7-tetrahydro-1,3-dimethyl-4-oxoisoindole.

Also in like fashion, 2,5-tetramethyl-γ-oxopyrrole-3-butyric acid is converted into 4,5,6,7-tetrahydro-1,3,5,5-tetramethyl-4-oxoisoindole and α,β,2,5-tetramethyl-γ-oxopyrrole-3-butyric acid is converted into 4,5,6,7-tetrahydro-1,3,5,6-tetramethyl-4-oxoisoindole.

EXAMPLE 11

4,5,6,7-tetrahydro-1,3-dimethyl-5-methylene-4-oxoisoindole

A mixture of 76 g. of 4,5,6,7-tetrahydro-1,3-dimethyl-4-oxoisoindole, 51.5 g. of dimethylamine hydrochloride and 12 g. of paraformaldehyde was heated under reflux under nitrogen for 24 hours to produce 1,3-dimethyl-5-dimethylaminomethyl-4-oxoisoindole hydrochloride, M.P. 188–189.5°. The hydrochloride was dissolved in water and treated with aqueous sodium hydroxide to produce the base, M.P. 169–170°. The base was dissolved in acetone and treated with gaseous methyl bromide. The methobromide salt, M.P. 236–238°, which crystallized from solution, was collected, dissolved in water and treated with aqueous sodium hydroxide. The yellow methylene compound separated. It was recrystallized from ethanol and melted at 150–151°.

In similar fashion, 4,5,6,7-tetrahydro-1,2,3-trimethyl-4-oxoisoindole was converted into 4,5,6,7-tetrahydro-1,2,3-trimethyl-5-methylene - 4 - oxoisoindole, M.P. 103–103.5°.

EXAMPLE 12

4,5,6,7-tetrahydro-1,3,5-trimethyl-4-oxoisoindole

A solution of 8.0 g. of 4,5,6,7-tetrahydro-1,3-dimethyl-5-methylene-4-oxoisoindole in 150 ml. of ethanol was shaken with 0.5 g. of 10% palladium on charcoal catalyst and hydrogen under 45 pounds pressure. After 20 minutes, hydrogen uptake ceased. The catalyst was removed and the solution evaporated to dryness. The crystalline residue was purified by recrystallization from benzene; M.P. 156–157°.

EXAMPLE 13

5-benzylidene-4,5,6,7-tetrahydro-1,3-dimethyl-4-oxoisoindole

A mixture of 14 g. of benzaldehyde, 11 g. of 4,5,6,7-tetrahydro-1,3-dimethyl - 4 - oxoisoindole and 27 ml. of 10% aqueous sodium hydroxide was heated under reflux under nitrogen for 24 hours. The organic layer was taken up in ether and extracted with aqueous sodium bisulfite to remove excess benzaldehyde. The ether was removed and the residue was chromatographed on alumina. An orange band of the product was eluted with benzene and gave deep yellow crystals from benzene and cyclohexane, M.P. 186–188°.

EXAMPLE 14

5-benzyl-4,5,6,7-tetrahydro-1,3-dimethyl-4-oxoisoindole 5-benzylidene-4,5,6,7-tetrahydro - 1,3 - dimethyl-4-oxoisoindole was shaken in ethanol with hydrogen in the presence of 10% palladium on charcoal by the procedure of Example 12 to give the reduced product.

EXAMPLE 15

4,5,6,7-tetrahydro-1-methyl-4-oxo-3-phenylisoindole

A mixture of 9.8 g. of 2-methyl-5-phenylpyrrole-3-butyric acid and 75 g. of polyphosphoric acid was heated at 148° for one hour. The dark mixture was poured into ice and water and the crude product, 9.0 g., crystallized. It was dissolved in benzene and passed through a short column of alumina to remove colored impurities. Concentration of the benzene eluate gave the product, M.P. 190–191.3°.

In similar fashion, 4,5,6,7-tetrahydro-1-methyl-4-oxo-3 - (p - methoxyphenyl)isoindole, 4,5,6,7 - tetrahydro - 1-methyl-4-oxo-3-(p-tolyl)isoindole, 4,5,6,7 - tetrahydro-1-methyl-4-oxo-3 - (p - chlorophenyl)isoindole and 4,5,6,7-tetrahydro-1-methyl-4-oxo-2,3-diphenylisoindole are prepared through cyclization of the respective pyrrole-3-butyric acids.

EXAMPLE 16

| Ingredient: | Mg./tablet |
|---|---|
| 4,5,6,7-tetrahydro - 1,3 - dimethyl - 4 - oxoisoindole | 20 |
| Lactose USP (spray dried) | 170 |
| Starch USP | 10 |
| Magnesium stearate USP | 1 |
| Stearic acid USP | 5 |
| Flavor | q.s. |

All above ingredients were passed through a 60-mesh sieve, blended for 30 minutes and compressed directly into tablets on a suitable tablet press at a weight of 206 mg., using a 11/32" biconcave, scored punch.

It will be understood that the foregoing description of the invention and the examples set forth, are merely illustrative of the principles thereof. Accordingly, the appended claims are to be construed as defining the invention within the full spirit and scope thereof.

We claim:
1. A compound of Formula A

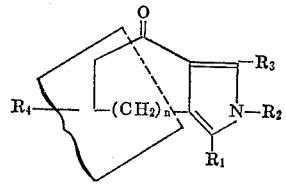

(Formula A)

wherein:
$R_1$, $R_2$ and $R_3$ are selected from the group consisting of hydrogen, alkyl having a maximum of six carbon atoms, phenyl, phenylalkyl in which the alkyl has a maximum of three carbon atoms, substituted phenyl and substituted phenylalkyl aforesaid in which the substituent on the aromatic ring is halogen, alkyl of not more than four carbon atoms, alkoxy of not more than four carbon atoms or halogenated alkyl of not more than four carbon atoms;

$R_4$ is selected from the group consisting of hydrogen, alkyl having a maximum of four carbon atoms, alkylidene having a maximum of four carbon atoms, benzylidene and benzyl;

$n$ is selected from the integers 1, 2 and 3.

2. A compound in accordance with Formula A of claim 1 wherein $R_4$ is hydrogen or methyl and $n$ is 1.

3. A compound is accordance with Formula A of claim 1 wherein $R_4$ is hydrogen or methyl and $n$ is 2.

4. A compound in accordance with claim 1 wherein Formula A is 2,4,5,6-tetrahydro-1,3-dimethyl-4-oxocyclopenta[C]pyrrole.

5. A compound in accordance with claim 1 wherein Formula A is 4,5,6,7-tetrahydro-1,3-dimethyl-4-oxoisoindole.

6. A compound in accordance with claim 1 wherein Formula A is 4,5,6,7-tetrahydro-1,2,3-trimethyl-4-oxoisoindole.

7. A compound in accordance with claim 1 wherein Formula A is 4,5,6,7-tetrahydro-1,3,5-trimethyl-4-oxoisoindole.

8. A compound in accordance with claim 1 wherein Formula A is 4,5,6,7-tetrahydro-1-methyl-4-oxo-3-phenylisoindole.

References Cited

UNITED STATES PATENTS 3,311,641   3/1967   Sunagawa et al. ____ 260—326.3

NICHOLAS S. RIZZO, *Primary Examiner.*

J. A. NARCAVAGE, *Assistant Examiner.*

U.S. Cl. X.R.

260—326.5, 326.3; 167—65